April 20, 1937. W. H. BASELT 2,077,661
CLASP BRAKE
Filed April 2, 1932 6 Sheets-Sheet 2
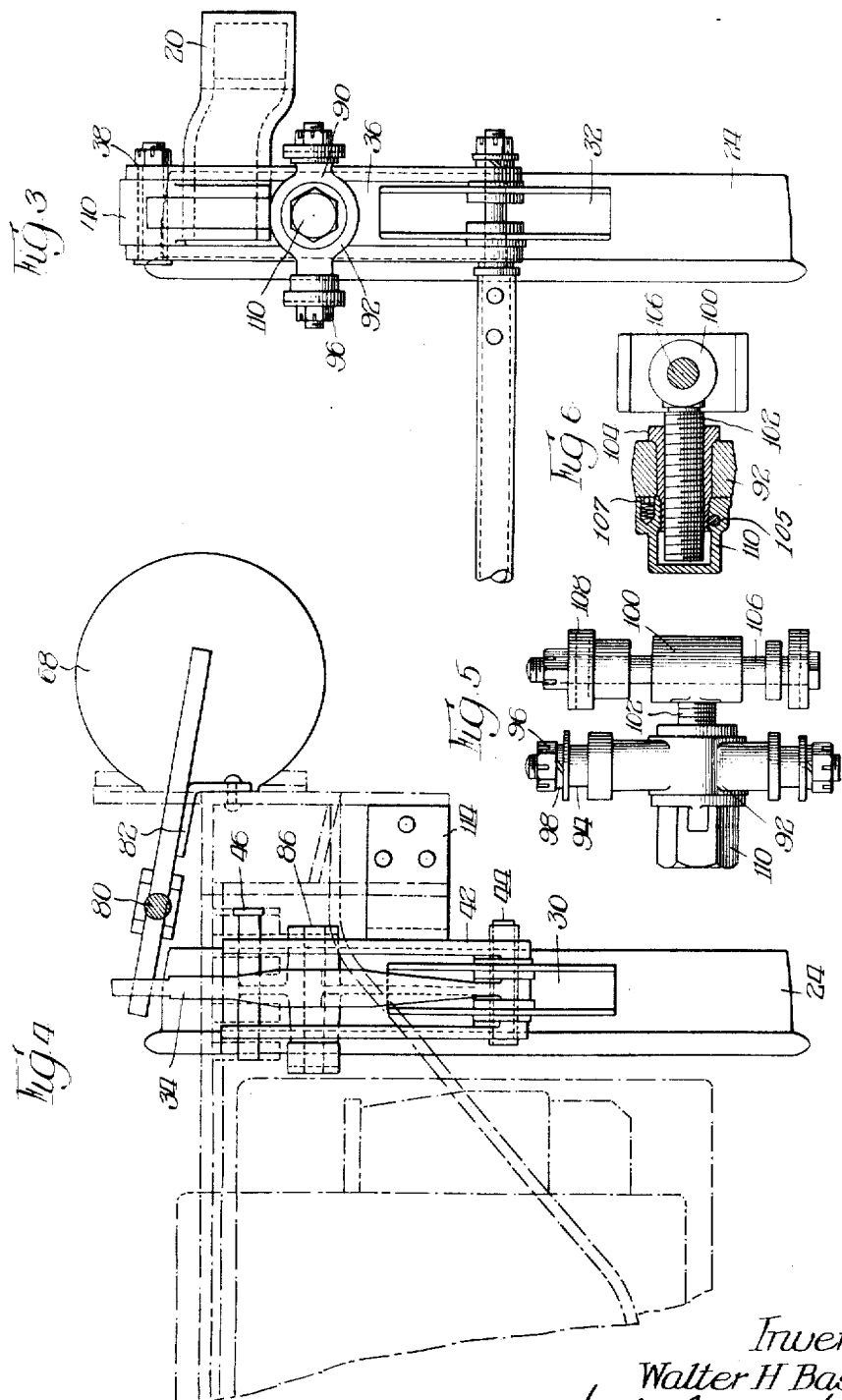

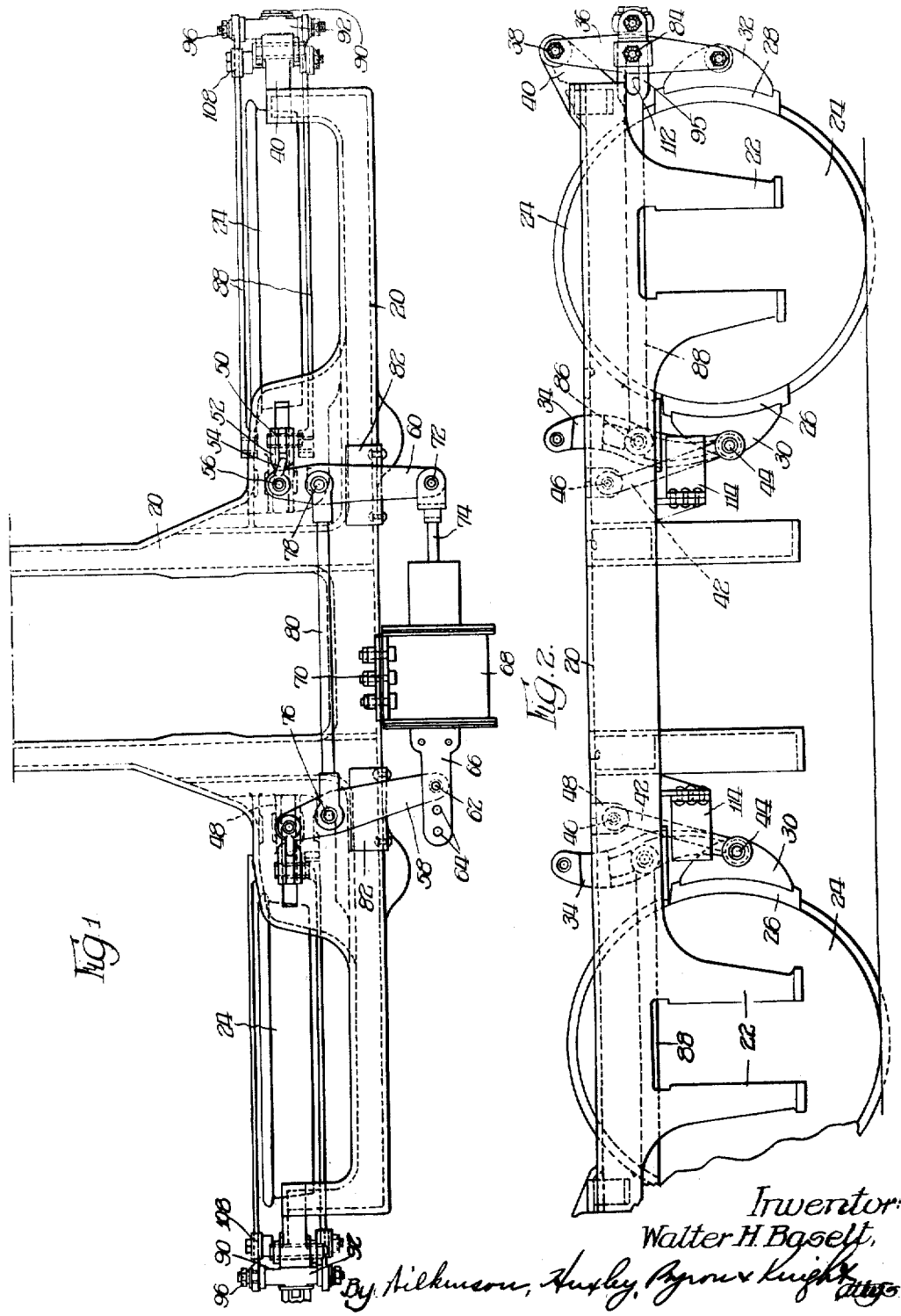

April 20, 1937.  W. H. BASELT  2,077,661
CLASP BRAKE
Filed April 2, 1932  6 Sheets-Sheet 3
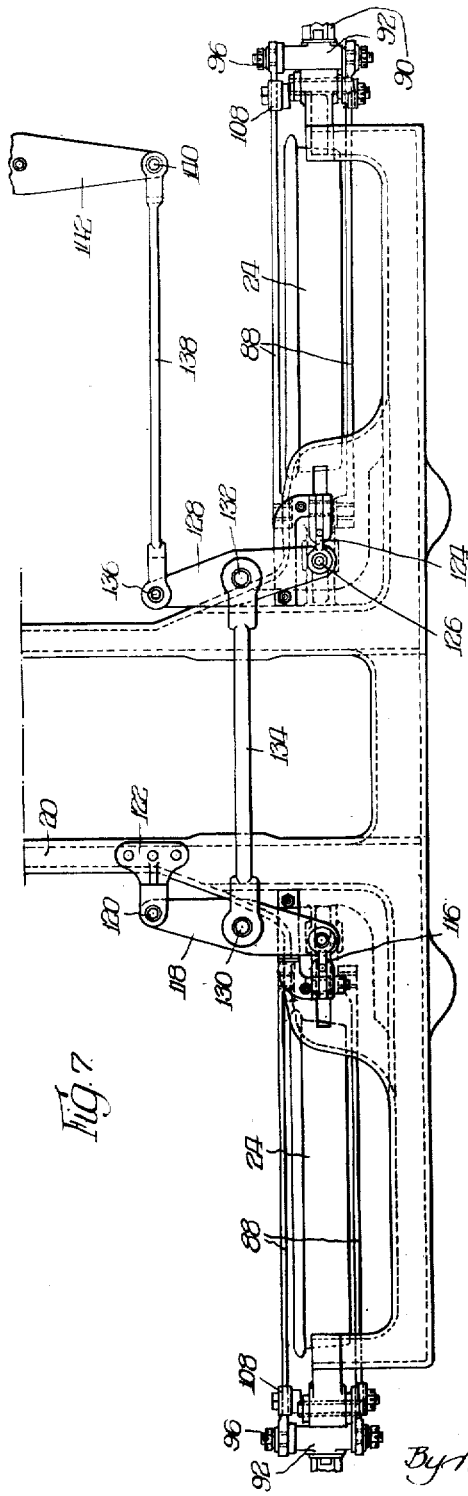
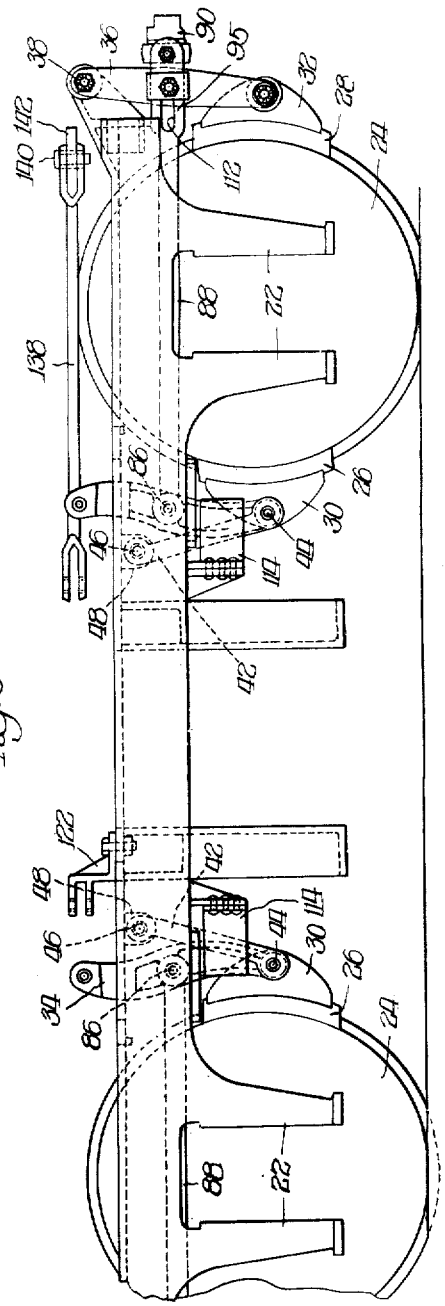
Inventor:
Walter H Baselt, April 20, 1937.   W. H. BASELT   2,077,661
CLASP BRAKE
Filed April 2, 1932   6 Sheets-Sheet 4
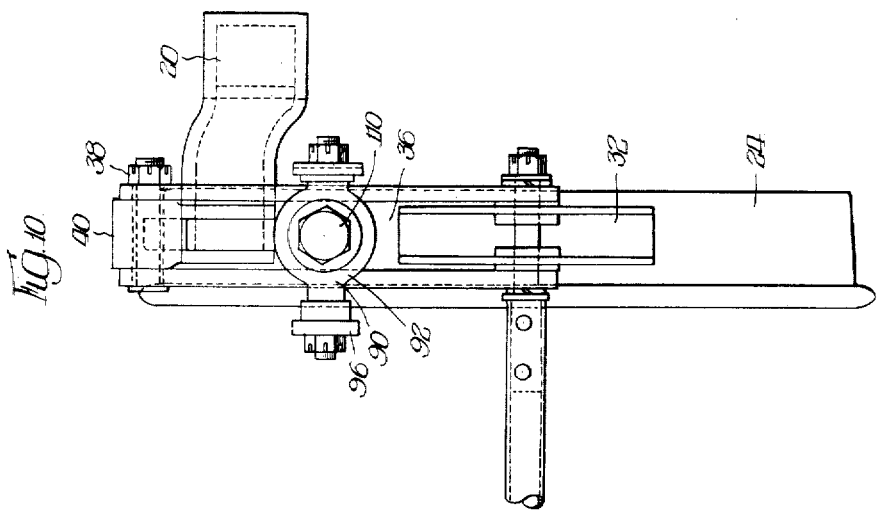
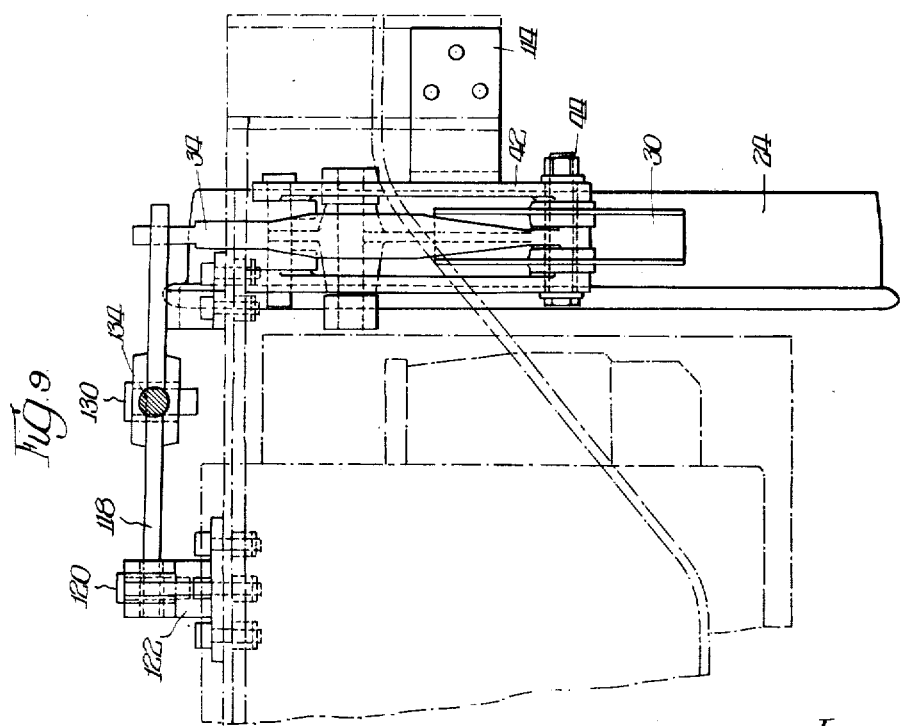
Inventor:
Walter H Baselt, April 20, 1937. W. H. BASELT 2,077,661
CLASP BRAKE
Filed April 2, 1932 6 Sheets-Sheet 5
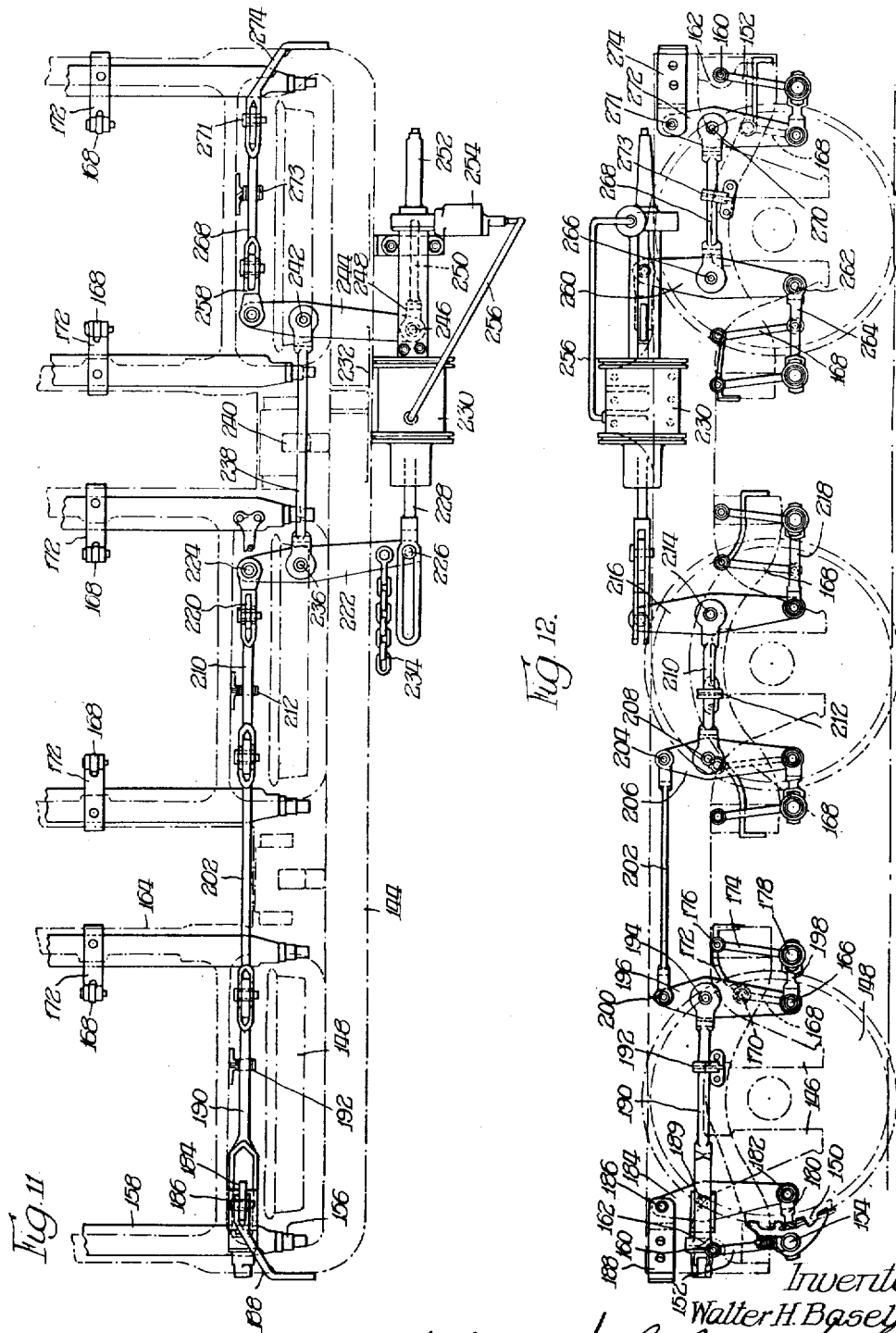
Inventor:
Walter H. Baselt,
By Wilkinson, Huxley, Byron & Knight
Attys.

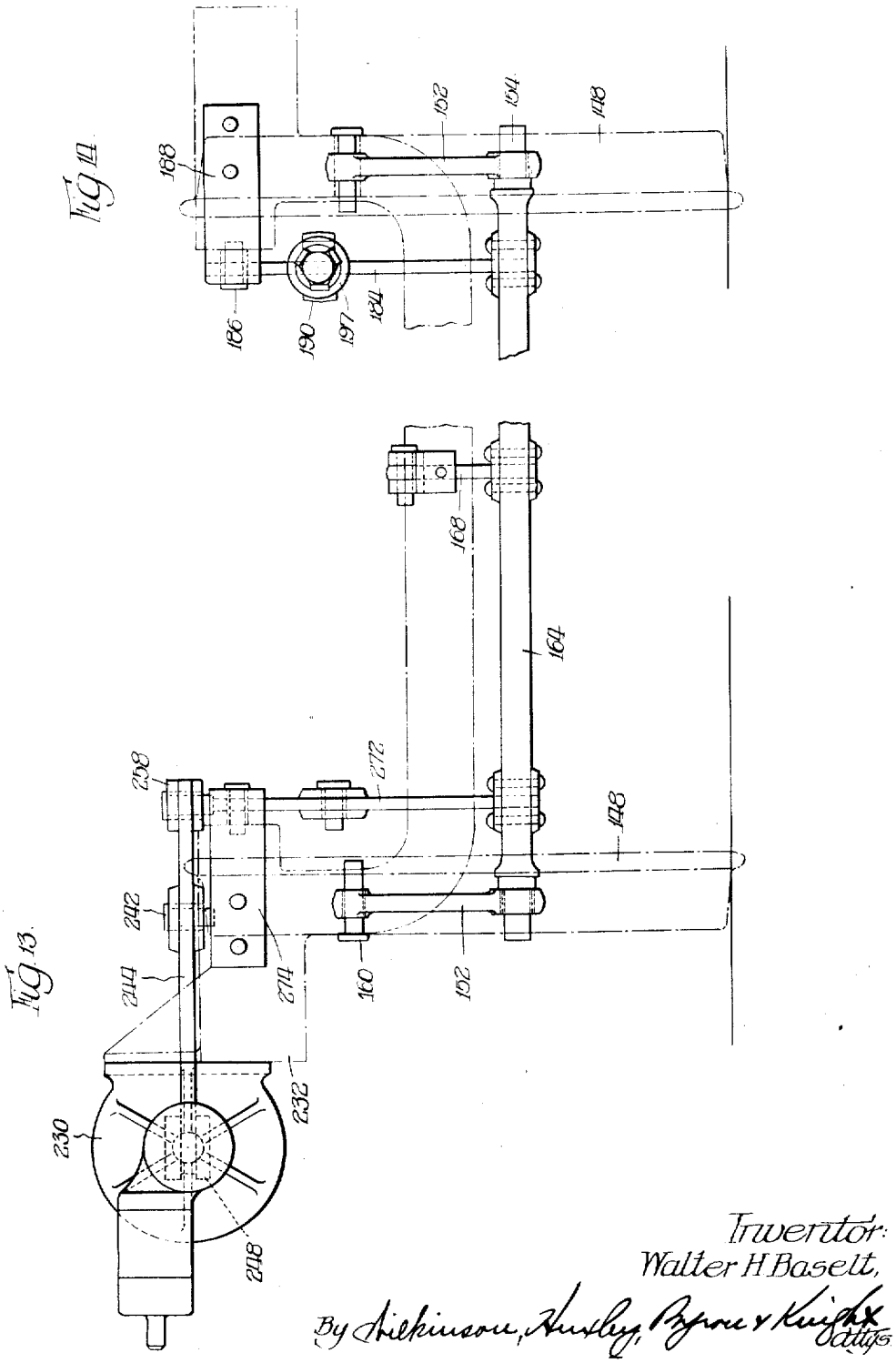

Patented Apr. 20, 1937

2,077,661

UNITED STATES PATENT OFFICE 2,077,661

CLASP BRAKE

Walter H. Baselt, Chicago, Ill., assignor to American Steel Foundries, Chicago, Ill., a corporation of New Jersey Application April 2, 1932, Serial No. 602,705

49 Claims. (Cl. 188—56)

The invention relates to brake rigging for railway car trucks, either of the beam type or of a beamless type of rigging, having associated therewith that type of brake in which a brake shoe is applied to opposite sides of a car wheel and known as the clasp brake.

An object of the present invention is to provide a type of brake rigging especially adapted to meet the conditions prevailing in railway motor trucks wherein it is necessary to provide sufficient space for the location of electric motors, generators and other equipment.

Another object is to provide a brake rigging equipped with improved means for taking up the slack in the rigging due to wear on the brake shoes and car wheels.

Yet another object is to provide a brake rigging in which the truck levers and tie rods are so arranged that the latter are prevented from falling on the rails should certain links or other connections fail.

A further object of the present invention is to provide a brake rigging of simple construction which will be light in weight and effective and positive in operation.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a railway car truck embodying the features of the present invention;

Figure 2 is a side elevation of the same;

Figure 3 is an end elevation of the arrangement shown in Figure 1;

Figure 4 is a fragmentary sectional view taken substantially along line 4—4 of Figure 1;

Figures 5 and 6 are detail views of the slack adjuster, some parts being shown in section;

Figure 7 is a fragmentary top plan view of a railway car truck showing a modified form of the present invention;

Figure 8 is a side elevation of the same;

Figure 9 is a fragmentary sectional view taken substantially along the line 9—9 of Figure 7;

Figure 10 is an end elevation of the arrangement shown in Figure 7;

Figure 11 is a fragmentary top plan view of a six-wheel truck construction showing the application of the invention thereto;

Figure 12 is a side elevation of the truck construction shown in Figure 11;

Figure 13 is an enlarged fragmentary end elevation of the truck construction shown in Figures 11 and 12, the view being taken from the right end of the truck, or that adjacent the operating cylinder;

Figure 14 is an enlarged fragmentary end elevation of the truck construction shown in Figures 11 and 12 taken at the opposite end of the truck from that of Figure 13, or from the left of the figures as shown.

This application is a continuation in part of application Serial No. 394,198, filed September 21, 1929.

Referring first of all more particularly to the truck construction shown in Figures 1 to 4 inclusive, the invention is shown as applied to a four-wheel truck consisting essentially of the truck frame 20 provided with pedestals 22 having cooperative relation with suitable journal boxes (not shown) or other journal means of wheel and axle assemblies 24. The wheels are adapted to be engaged on each side thereof by inner and outer brake shoes 26 and 28. The brake heads 30 and 32 of said brake shoes are pivotally secured to inner and outer truck levers 34 and 36, the inner levers thereof being live truck levers, and the outer levers thereof being dead truck levers, the dead truck levers being fulcrumed as at 38 to brackets 40 provided at the end of the truck frame.

Brake hangers 42 are provided for the live truck levers, being pivoted to the brake heads as at 44 to which the live truck levers are also pivoted, and pivotally mounted as at 46 to the bracket 48 provided on the truck frame. The upper ends of the live truck levers 34 are pivotally connected as at 50 to the clevis or link 52, said link being engaged by the clevis or link 54, which in turn is pivotally mounted as at 56 on the dead equalizing or cylinder lever 58 at the one end of the truck, and to the live equalizing or cylinder lever 60 at the other end of the truck. The dead lever 58 is fulcrumed as at 62 to selected apertures 64 provided in the bracket 66, said bracket being positioned on the brake cylinder 68 secured to the truck frame 70. The live lever 60 is pivotally mounted at its outer end as at 72 to the piston rod 74 adapted to be actuated by the suitable piston provided in the brake cylinder 68.

The dead and live levers 58 and 60 are connected intermediate their ends as at 76 and 78 by the pull rod or cross bar 80, and the dead and live levers are adapted to be supported on the truck frame by angle plate 82. The pairs of dead and live levers disposed on opposite sides of the wheel and axle assemblies 24 are pivotally connected intermediate their ends as at 84 and 86 by means of the pull or tie rods 88, said rods being disposed above the axles of the wheel and axle assemblies. The pull rods 88 are disposed on opposite sides of the wheel and are provided at their outer ends with the slack adjuster 90. The slack adjuster shown in Figures 5 and 6 includes a trunnion member 92 having bearings or trunnions 94 on each side thereof for receiving the slotted heads 95 of pull rods 88, the rods being secured in position by means of the nuts and lock washers 96 and 98. An adjusting screw member 100 is secured to the trunnion member by means of the threaded portion 102 and the adjusting nut 104. The screw member is also provided on either side with bearings 106 and suitable washers 108. A cap 110 serves to cover the exposed end of the adjusting screw and is itself threaded on the nut 104 a locking pin 105 fixing the cap to the nut 104 whereby the nut may be rotated to move member 100 by the threads 102 by rotating the cap 110. The cap 110 is provided with the spring pressed ball 107 adapted to engage spaced indentations in member 92 whereby the cap 110 and the nut 104 are selectively fixed with respect to member 92 by the stop means formed by said spring pressed ball and the cooperating identations.

In assembling the slack adjuster with the pull rods 88, each rod is secured to the trunnion member 94 and secured by the nuts 96. The dead truck levers 36 are also provided with suitable openings intermediate their extremities for receiving the bearing members 106 on the adjusting screw 100 so that the dead levers and pull rods are maintained in adjusted position and are spaced as desired by varying the spacing between the members 92 and 100 through the adjusting nut 104. With the slack adjuster in position the washers 108 on the members 106 find bearing engagement in various adjusted positions along the outer end or head 95 of the pull rods 88. The adjuster, in combination with the adjustment of the lever 58 in the various openings 64, allows for a wide range of the adjustment of the brake rigging.

In operation, when air is introduced to the operating cylinder 68, movement of the piston rod 74 toward the right as viewed in the figures causes the lever 60 to be moved to the right, exerting a pull on the pull rod 80. Movement of the pull rod 80 causes pivotal movement, in a clockwise direction, of the dead lever 58, which in turn moves the live truck lever 34. Movement of the live truck lever causes movement of the pull rod 88, causing the outer brake shoes 28 to be set. Restricted movement of the pull rod 88 causes the live lever 34 to pivot around the point 86 to set the inner brake shoe 26 at the right of the drawings. Restricted movement of the pull rod 80 causes the live lever 60 to pivot around the connection 78, which causes the brake shoes 26 and 28 at the left of the figure to be set in a similar manner to the brake shoes 26 and 28 already described.

Referring now more particularly to the construction shown in Figures 7 to 10 inclusive, the arrangement of the live and dead truck levers, the connections therebetween, and the slack adjuster arrangement, are similar to that already described. The operating means therefor is varied. Either a brake cylinder operation is contemplated, or a hand operation, or both. The cylinder, if such is used, may be secured to either the car body or the truck frame.

In this construction, the live truck lever 34 at the left of the figure is connected through the clevis or link connection 116 to the outer end of the dead lever 118, the inner end thereof being pivotally connected as at 120 to the bracket 122 secured to the truck frame 20. The live truck lever 34 at the right of the figure is pivotally connected through the clevis or link connection 124 as at 126 to the outer end of the live lever 128. The dead and live levers 118 and 128 are pivotally connected intermediate the ends thereof, as at 130 and 132, to the pull rod 134, and the inner end of the lever 128 is pivotally connected as at 136 to the pull rod 138 pivotally connected as at 140 to the radius or equalizing lever 142. The hand or mechanical operating means may be secured to the equalizing rod 142.

In operation of this form of the invention, movement of the equalizing bar 142 to the right as viewed in the figures causes the pull rod 138 to move the live lever 128 toward the right. Movement of the live lever 128 toward the right causes a counter-clockwise movement of the dead lever 118 through the pull rod 134. This movement of the dead and live levers causes operation of the brake shoes in a manner similar to that described with respect to Figures 1 and 2.

In the construction shown in Figures 11 to 14 inclusive, the brake rigging is shown as applied to a six-wheel truck. In this embodiment of the invention the truck frame 144 is provided with the depending pedestals 146 having cooperative relation with a suitable journal box or other journal means of the wheel and axle assemblies 148. Brake shoes are provided on the opposite sides of the wheels of the wheel and axle assemblies, only one brake shoe 150 being shown. The brake shoe at the left end of the truck as viewed in the figures is supported on the truck frame by means of the brake hanger 152 pivotally mounted to the brake shoe as at 154 through pivotal connection to the trunnions 156 of the brake beam 158. The brake hanger 152 is pivotally connected as at 160 to a suitable bracket 162 provided on the truck frame. Other brake beams 164 are provided for the remaining brake shoes, said brake beams being pivotally connected as at 166 to the balance hangers 168, said hangers being pivoted as at 170 to the respective brackets 172 provided on the truck frame. Brake hangers 174 are also provided for the brake shoes, said hangers being pivoted as at 176 to the truck frame, and as at 178 to the trunnions of the brake beams. The brake beam at the left end of the truck as viewed in the figures is pivoted to a fulcrum 180, the fulcrum 180 being pivotally connected as at 182 to the lower end of the dead truck lever 184, the upper end of the dead truck lever being pivoted as at 186 to the bracket 188 secured to the truck frame.

The dead truck lever 184 is pivoted intermediate its ends as at 189 to the pull rod 190, the pull rod being guided in the bracket 192 provided on the truck frame and being pivoted as at 194 to the live truck lever 196 intermediate the ends thereof. A slack adjuster 197 may be provided similar to the slack adjuster 90 and disposed on the end of the pull rod 190. The lower end of the live truck lever is pivoted as at 196 to the fulcrum 198 which is mounted to the brake beam 164. The upper end of the live truck lever 196 is pivoted as at 200 to a pull rod 202 which is pivoted as at 204 to a live truck lever 206 which is similar to the truck lever 196 and connected to its brake shoe in a similar manner, the brake shoe and brake beam connection being similar to that already described. The live truck lever 206 is pivotally mounted intermediate the ends thereof as at 208 to the pull rod 210 which is guided on the truck frame by means of the bracket 212. The end of the pull rod 210 is pivotally mounted as at 214 to the live truck lever 216. The lower end of the live truck lever is connected through the fulcrum 218 to its respective brake beam 164. The upper end of the live truck lever 216 is pivotally linked as at 220 to the inner end of the live operating lever 222, the link connection 220 being pivoted to the inner end of the live operating lever as at 224. The outer end of the lever 222 is connected through the pin and slot connection 226 to the piston rod 228 of the operating brake cylinder 230, said brake cylinder being mounted in a suitable bracket 232 provided on the truck frame.

The operating lever 222 is also provided with the flexible operating connection 234 adjacent the pin and slot connection, said connection 234 extending to suitable hand or auxiliary operating means. The lever 222 is pivotally mounted as at 236 intermediate the ends thereof to the pull rod 238, said pull rod being supported on the bracket 240 and pivotally connected as at 242 to the lever 244 intermediate the ends thereof. The outer end of the lever 244 is pivoted as at 246 to the crosshead 248, the crosshead being provided with the adjuster screw 250 controlled by the ratchet nut 252, the ratchet nut being operated by suitable mechanism controlled by the cylinder 254 connected to the pipe 256 with the operating cylinder 230, all as illustrated and described in co-pending application Serial No. 592,700, Mitchell, filed February 13, 1932.

The inner end of the lever 244 is pivotally connected as at 258 to the upper end of the live truck lever 260, the lower end of the live truck lever being pivotally mounted as at 262 to the fulcrum 264 connected to its respective brake beam. The live truck lever 260 is pivotally connected as at 266 to the pull rod 268 which is pivotally connected as at 270 to the dead truck lever 272 intermediate the ends thereof, the lower end of the dead truck lever being pivotally connected to its respective brake beam. The bracket 273 serves as a guide for the pull rod 268. The upper end of the dead truck lever is pivotally connected as at 271 to the bracket 274 provided on the truck frame.

In operation of this form of construction, movement of the piston rod 228 to the left as viewed in Figure 11, or movement toward the left of the connection 234 by the auxiliary or hand operating means causes movement of the operating lever 222 toward the left. Movement of the lever 222 causes a pull in the various pull rods to set the brakes in a manner already described. Adjustment of slack takes place manually through the means 107 or automatically through the slack adjuster at the cylinder, the threaded portion 250 of the automatic means moving toward the right as viewed in the figures to properly adjust any slack which may occur.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a brake rigging, the combination with a truck frame, a plurality of truck levers, a tie rod connecting certain of said truck levers, other levers having pivotal engagement with certain of said truck levers, a bar connecting the last mentioned levers intermediate the ends thereof, one of said last mentioned levers being pivotally secured to said truck frame, and actuating means secured to the other of said last mentioned levers and disposed between said last named levers.

2. In a brake rigging, the combination with a truck frame, a plurality of truck levers, a plurality of other levers having pivotal engagement with the truck levers, a bar connecting said other levers intermediate the ends thereof, and means operatively connected to said other levers and actuating one of said other levers, said means being secured to said truck frame and operating toward said last named lever to move the brake rigging to braking position.

3. In a brake rigging, the combination with a truck frame, a plurality of truck levers pivotally secured thereto, a plurality of other levers having pivotal engagement with the truck levers, means on said truck frame for adjustably securing one of said other levers thereto, a bar connecting said other levers intermediate the ends thereof, and means secured to the truck frame intermediate said other levers for actuating said other levers.

4. In a brake rigging, the combination with live truck levers on one side of a wheel, and dead truck levers on the other side of a wheel, brake shoes provided for said dead and live levers and adapted to have braking cooperation with said wheels, tie rods connecting said live and dead truck levers, slack adjusting means secured to the outer end of said tie rods and having engagement with said dead truck levers, other levers in pivotal engagement with the live truck levers, means for pivotally and adjustably securing one of said other levers, and means on the frame and located intermediate the other levers for actuating said other levers.

5. In a truck, the combination of a truck frame, spaced wheels cooperating therewith, dead levers pivoted to said truck at each end thereof adjacent said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers above the wheel centers, a brake cylinder mounted on said frame between said wheels, a dead lever pivoted to said brake cylinder adjacent one of said live levers and connected thereto, a live lever operatively connected to said cylinder, said last named live lever being connected to said last named dead lever and said other live lever.

6. In a truck, the combination of a truck frame, spaced wheels cooperating therewith, dead levers pivoted to said truck at each end thereof adjacent said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers above the wheel centers, a brake cylinder mounted on said frame between said wheels, a dead lever pivoted intermediate said wheels to said brake cylinder adjacent one of said live levers and connected thereto, a live lever operatively connected to said cylinder, said last named live lever being connected to said last named dead lever and said other live lever.

7. In a truck, the combination of a truck frame, spaced wheels cooperating therewith, dead levers pivoted to said truck at each end thereof adjacent said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers, a brake cylinder mounted on said frame between said wheels, a dead lever pivoted to said brake cylinder adjacent one of said live levers and connected thereto, a live lever operatively connected to said cylinder, said last named live lever being connected to said last named dead lever and said other live lever.

8. In a truck, the combination of a truck frame, spaced wheels cooperating therewith, dead levers pivoted to said truck at each end thereof adjacent said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers, a brake cylinder mounted on said frame between said wheels, a dead lever pivoted intermediate said wheels to said brake cylinder adjacent one of said live levers and connected thereto, a live lever operatively connected to said cylinder, said last named live lever being connected to said last named dead lever and said other live lever.

9. In a truck, the combination of a truck frame, spaced wheels cooperating therewith, dead levers pivoted to said truck at each end thereof adjacent said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers above the wheel centers, a brake cylinder mounted on said frame, a dead lever pivoted to said brake cylinder adjacent one of said live levers and connected thereto, a live lever operatively connected to said cylinder, said last named live lever being connected to said last named dead lever and said other live lever.

10. In a brake rigging, the combination of a truck frame, brake shoes disposed at both sides of a wheel, truck levers operatively connected to said brake shoes, a rod connecting said truck levers above the connection between the truck levers and brake shoes, a brake cylinder mounted on said truck frame and provided with fulcrum means, a dead lever pivotally connected to said fulcrum means and operatively connected to one of said truck levers above the wheel center, and an operative connection between said dead lever and a piston in said brake cylinder.

11. In a brake rigging, the combination of a truck frame, brake shoes disposed at both sides of a wheel, truck levers operatively connected to said brake shoes, a rod connecting said truck levers above the connection between the truck levers and brake shoes, a brake cylinder mounted on said truck frame and provided with adjustable fulcrum means, a dead lever pivotally connected to said adjustable fulcrum means, and operatively connected to one of said truck levers above the wheel center, and an operative connection between said dead lever and a piston in said brake cylinder.

12. In a brake rigging, the combination of a truck frame and a plurality of pairs of wheels, brake shoes disposed at both sides of each wheel, truck levers operatively connected to said brake shoes, a rod connecting the truck levers for each wheel above the connection between the truck levers and brake shoes, a brake cylinder mounted on said truck frame and provided with fulcrum means, a dead lever pivotally connected to said fulcrum means and operatively connected to one of said truck levers, and a rod connecting said dead lever to a cylinder lever, said cylinder lever being pivotally connected to a piston in said brake cylinder and operatively and directly connected to another truck lever.

13. In a brake rigging, the combination of a truck frame and a plurality of pairs of wheels, brake shoes disposed at both sides of each wheel, truck levers operatively connected to said brake shoes, a rod connecting the truck levers for each wheel above the connection between the truck levers and brake shoes, a brake cylinder mounted on said truck frame and provided with fulcrum means, a dead lever pivotally connected to said fulcrum means and operatively connected to a truck lever of one wheel, a cylinder lever operatively and directly connected to a truck lever of another wheel and to a piston in said brake cylinder, and a rod connecting said dead and cylinder levers.

14. In a brake rigging, the combination of a truck frame, brake shoes disposed at both sides of a wheel, truck levers operatively connected to said brake shoes, a rod connecting said truck levers above the wheel center, a brake cylinder mounted on said truck frame and provided with fulcrum means, a dead lever pivotally connected to one of said truck levers, an operative connection between said dead lever and a piston in said brake cylinder, and means on said truck frame for supporting said dead lever.

15. In a brake rigging, the combination of a truck frame and a plurality of pairs of wheels, brake shoes disposed at both sides of each wheel, truck levers operatively connected to said brake shoes, a rod connecting the truck levers for each wheel above the wheel centers, a brake cylinder mounted on said truck frame and provided with fulcrum means, a dead lever pivotally connected to said fulcrum means and operatively connected to a truck lever of a wheel, a cylinder lever operatively connected to a truck lever of another wheel and to a piston in said brake cylinder, a rod connecting said dead and cylinder levers, and means on said truck frame for supporting said cylinder lever.

16. In a beamless brake rigging, the combination of a truck frame and a plurality of pairs of wheels, truck levers operatively connected to brake shoes applied to the opposite side of each wheel, a rod connecting said truck levers, a dead lever connected to one of said truck levers, a live lever connected to another truck lever and to said dead lever, and a brake cylinder mounted on said truck frame intermediate said dead and live levers and operatively connected to said live lever.

17. In a truck brake rigging, the combination with a truck frame comprising spaced side members, of a brake cylinder device carried by one of said side members adjacent the transverse center line of the truck frame, and a system of operatively connected levers and rods carried by the truck frame and operatively connected with said brake cylinder device, said system comprising a live lever adapted to be operated by the brake cylinder device and also comprising a dead lever adjustably anchored to the brake cylinder device.

18. In a brake rigging, the combination of a truck frame, spaced wheels associated therewith for supporting said frame, brake shoes disposed on each side of each wheel, a dead truck lever disposed at each end of said truck frame and connected to certain of said brake shoes, intermediate live truck levers connected to said dead truck levers and to each other and associated with the other brake shoes, live and dead cylinder levers connected to certain of said live levers and to each other, and means on the truck frame intermediate said cylinder levers for actuating said cylinder levers for braking application.

19. In a brake rigging, the combination of a truck frame, spaced wheels associated therewith for supporting said frame, brake shoes disposed on each side of each wheel, a dead truck lever disposed at each end of said truck frame and connected to certain of said brake shoes, intermediate live truck levers connected to said dead truck levers and to each other and associated with the other brake shoes, cylinder levers connected to certain of said live levers and to each other, and means on the truck frame intermediate said cylinder levers for actuating said cylinder levers for braking application.

20. In a brake rigging, the combination of a truck frame, spaced wheels associated therewith for supporting said frame, brake shoes disposed on each side of each wheel, truck levers arranged in pairs associated with each wheel in the plane thereof and in supporting relation to said brake shoes, a pull rod connecting each pair of truck levers above the wheel centers, and means on the truck frame disposed between said wheels for operating said truck levers for braking application, said means including live and dead levers connected together intermediate the ends thereof and each respectively connected adjacent an end thereof to a truck lever of one of the pairs of truck levers.

21. In a brake rigging, the combination of a truck frame, spaced wheels associated therewith for supporting said frame, brake shoes disposed on each side of each wheel, dead and live truck levers arranged in pairs associated with each wheel and in supporting relation to said brake shoes, a pull rod connecting each pair of dead and live levers above the wheel centers, cylinder levers for operating said truck levers and means between said cylinder levers for applying power to said cylinder levers on the outside of said truck frame.

22. In a brake rigging, the combination of a truck frame, spaced wheels associated therewith for supporting said frame, brake shoes disposed on each side of each wheel, dead and live truck levers arranged in pairs associated with each wheel and in supporting relation to said brake shoes, a pull rod connecting each pair of dead and live levers above the wheel centers, a brake cylinder disposed between said wheels, cylinder levers connected to certain of said truck levers and to each other, one of said cylinder levers being connected through lost motion means to the piston of said cylinder and auxiliary means connected to said last named cylinder lever for operating said cylinder lever independently of said piston for braking application.

23. In a brake rigging, the combination of a truck frame, spaced wheels associated therewith for supporting said frame, brake shoes disposed on each side of each wheel, dead and live truck levers arranged in pairs associated with each wheel and in supporting relation to said brake shoes, a pull rod connecting each pair of dead and live levers above the wheel centers, a brake cylinder disposed between said wheels, cylinder levers connected to certain of said truck levers and to each other, one of said cylinder levers being connected through lost motion means to the piston of said cylinder and auxiliary means connected to one of said cylinder levers for operating said cylinder lever independently of said piston for braking application.

24. In a brake rigging the combination of a truck frame, spaced wheels associated therewith for supporting said frame, brake shoes disposed on each side of said wheels, dead and live truck levers arranged in pairs associated with each wheel and in supporting relation with said brake shoes, a pull rod connecting each pair of dead and live truck levers, cylinder levers connected and connected to each other, means for actuating one of said cylinder levers, and means for slidably supporting each of said cylinder levers on said truck frame.

25. In a brake rigging, the combination of a truck frame, wheels supporting said truck frame, live truck levers on one side of each wheel, connecting means between said live truck levers, including a plurality of cylinder levers and a pull rod connected thereto, one of said cylinder levers being connected to each truck lever, dead truck levers on the other side of each wheel, tie straps connecting said truck levers on each side of each wheel and above the wheel centers, and operating cylinder means operatively connected to each of said cylinder levers for controlling operation of said rigging.

26. In a brake rigging, the combination of a truck frame, wheels supporting said truck frame, live truck levers on one side of each wheel, connecting means between said live truck levers, dead truck levers on the other side of each wheel, tie straps connecting said truck levers on each side of each wheel, and operating cylinder means disposed between said live truck levers and operatively connected to pairs of said live truck levers for controlling said rigging.

27. In a truck, the combination of a truck frame having a side frame, spaced wheels in supporting relation to said truck frame, brake rigging associated with said wheels, and operating means for said brake rigging, said operating means including a brake cylinder supported by said side frame, substantially horizontal cylinder levers operatively connected to each other and to said brake cylinder, one of said levers being a live lever, said levers being connected to said brake rigging.

28. In a truck, the combination of a truck frame having a side frame, spaced wheels in supporting relation to said truck frame, brake rigging associated with said wheels, and operating means for said brake rigging, said operating means including a brake cylinder supported by said side frame between adjacent wheels, substantially horizontal cylinder levers operatively connected to each other and to said brake cylinder, said levers being connected to said brake rigging.

29. In a truck, the combination of a truck frame having a side frame, spaced wheels in supporting relation to said truck frame, brake rigging associated with said wheels, and operating means for said brake rigging, said operating means including a brake cylinder supported by said side frame, cylinder levers operatively connected to each other intermediate the ends thereof and to said brake cylinder adjacent their ends, one of said levers being a live lever, said levers being connected to said brake rigging.

30. In a truck, the combination of a truck frame having a side frame, spaced wheels in supporting relation to said truck frame, brake rigging associated with said wheels, and operating means for said brake rigging, said operating means including a brake cylinder supported by said side frame between adjacent wheels, substantially horizontal cylinder levers operatively connected to each other intermediate the ends thereof and to said brake cylinder adjacent their ends, said levers being connected to said brake rigging.

31. In a brake rigging, the combination of a truck frame, wheels supporting said frame, truck levers disposed adjacent each wheel, cylinder levers connected to said truck levers, an operating cylinder connected to said frame between said cylinder levers, the piston of said cylinder being connected to one of said cylinder levers, the other of said cylinder levers being adjustably connected to said cylinder to accommodate slack in said rigging.

32. In a brake rigging, the combination of a truck frame, wheels supporting said frame, truck levers disposed adjacent each wheel, cylinder levers connected to said truck levers, an operating cylinder connected to said frame between said cylinder levers, an automatic slack adjuster provided on said cylinder, the piston of said cylinder being connected to one of said cylinder levers, the other of said cylinder levers being pivotally connected to said slack adjuster to accommodate slack in said rigging.

33. In a brake rigging, the combination of a truck frame, wheels supporting said frame, truck levers disposed adjacent each wheel, cylinder levers connected to said truck levers, an operating cylinder connected to said frame between said cylinder levers, an automatic slack adjuster provided on said truck frame, the piston of said cylinder being connected to one of said cylinder levers, the other of said cylinder levers being adjustably connected to said cylinder to accommodate slack in said rigging.

34. In a brake rigging, the combination with a truck frame, a plurality of truck levers, a brake beam connecting certain of said truck levers, other levers having pivotal engagement with certain of said truck levers, a bar connecting the last mentioned levers intermediate the ends thereof, one of said last mentioned levers being a dead lever, and actuating means secured to the other of said last mentioned levers and disposed between said last named levers.

35. In a brake rigging, the combination with a truck frame, wheels associated therewith, brake beams on each side of said wheels, a plurality of truck levers associated with said brake beams, a plurality of other levers having pivotal engagement with the truck levers, a bar connecting said other levers intermediate the ends thereof, and means actuating one of said other levers, said means being secured to said truck frame.

36. In a brake rigging the combination with wheels, each wheel having an axle, a live truck lever at one side of an axle, and a dead truck lever at the other side of an axle, said live and dead truck levers being disposed inwardly of the plane of the adjacent wheel, brake shoes provided for said dead and live levers and adapted to have braking cooperation with said wheels, tie rods connecting said live and dead truck levers, other levers in pivotal engagement with the live truck levers, means for pivotally and adjustably securing one of said other levers, and means on the frame located intermediate the other levers for actuating said other levers.

37. In a brake rigging, the combination of a truck frame, spaced wheels for supporting said truck frame, a dead truck lever on one side of each wheel and in the plane thereof, adjacent live truck levers on the opposite sides of each wheel and in the plane thereof, tie straps embracing the adjacent wheel and pivoted to pairs of dead and live truck levers intermediate the ends of said truck levers, said straps being disposed above the axles of said wheels, brake heads pivoted adjacent the lower ends of each truck lever and having shoes for braking cooperation with said wheels, hangers pivoted adjacent the upper ends to said truck frame and supporting said heads by a pivotal connection thereto adjacent the lower ends of said hangers and at the same pivotal connection between said head and truck levers, substantially horizontally disposed levers connected together intermediate the ends thereof, one of said levers being a dead lever pivoted adjacent one end thereof to the truck frame and adjacent the other end thereof to one of said live truck levers, the other of said horizontal levers being a live lever pivoted adjacent one end thereof to the other of said live truck levers, and brake actuating means pivotally connected to the other end of said live horizontal lever.

38. In a brake rigging, the combination of a truck frame, spaced wheels for supporting said truck frame, a dead truck lever on one side of each wheel and in the plane thereof, adjacent live truck levers on the opposite sides of each wheel and in the plane thereof, tie straps embracing the adjacent wheel and pivoted to pairs of dead and live truck levers intermediate the ends of said truck levers, said straps being disposed above the axles of said wheels, brake heads pivoted adjacent the lower ends of each truck lever and having shoes for braking cooperation with said wheels, hangers pivoted adjacent the upper ends to said truck frame and supporting said heads by a pivotal connection thereto adjacent the lower ends of said hangers and at the same pivotal connection between said head and truck levers, substantially horizontally disposed levers connected together intermediate the ends thereof, one of said levers being a dead lever pivoted adjacent one end thereof to the truck frame and adjacent the other end thereof to one of said live truck levers, the other of said horizontal levers being a live lever pivoted adjacent one end thereof to the other of said live truck levers, and brake actuating means pivotally connected to the other end of said live horizontal lever and operating in the direction of the adjacent wheel.

39. In a truck, the combination of a truck frame, spaced wheels cooperating therewith, said wheels having axles, dead levers pivoted to said truck at each end thereof adjacent and inwardly of said wheels, live levers disposed adjacent said wheels on the opposite sides of said axles from said dead levers, brake shoes provided for said dead and live levers and adapted to have braking cooperation with said wheels, pull rods connecting adjacent pairs of dead and live levers above the wheel centers, a dead lever pivoted adjacent one of said live levers and connected thereto, a live lever, means for operating said last named live lever including a brake cylinder mounted on said frame, the piston of said cylinder being connected to said last named live lever, said last named live lever being connected to said last named dead lever and said other live lever.

40. In a truck, the combination of a truck frame, spaced wheels cooperating therewith, said wheels having axles, brake beams on each side of each wheel, dead levers pivoted to said truck at each end thereof adjacent said wheels, live levers disposed adjacent said wheels on the opposite sides of said axles from said dead levers, said levers cooperating with said brake beams, brake shoes carried by said brake beams and adapted to have braking cooperation with said wheels, pull rods connecting adjacent pairs of dead and live levers, a dead lever pivoted to said truck frame adjacent one of said live levers and connected thereto, a live lever, means for operating said last named live lever including a brake cylinder mounted on said frame, the piston of said cylinder being connected to the end of said last named live lever, said last named live lever being connected to said last named dead lever and said other live lever.

41. In a truck, the combination of a truck frame, spaced wheels cooperating therewith, said wheels having axles, dead levers pivoted to said truck at each end thereof adjacent said wheels, live levers disposed adjacent said wheels on the opposite sides of said axles from said dead levers, said levers being inwardly of the plane of said wheels, brake shoes provided for said dead and live levers and adapted to have braking cooperation with said wheels, pull rods connecting adjacent pairs of dead and live levers, a brake cylinder mounted on said frame betwen said wheels, a dead lever pivoted to said brake cylinder adjacent one of said live levers and connected thereto, a live lever operatively connected to said cylinder, said last named live lever being connected to said last named dead lever and said other live lever.

42. In a truck, the combination of a truck frame, spaced wheels cooperating therewith, said wheels having axles, dead levers pivoted to said truck at each end thereof adjacent and inwardly of said wheels, live levers disposed adjacent said wheels on the opposite sides of said axles from said dead levers, brake shoes provided for said dead and live levers and adapted to have braking cooperation with said wheels, pull rods connecting adjacent pairs of dead and live levers above the wheel centers, a dead lever pivoted adjacent one of said live levers and connected thereto, a live lever, means for operating said last named live lever including a brake cylinder secured to said truck frame between said last named dead and live levers, the piston of said cylinder being connected to said last named live lever, said last named dead lever being pivoted to said cylinder; said last named live lever being connected to said last named dead lever and said other live lever.

43. In a truck, the combination of a truck frame, spaced wheels cooperating therewith, said wheels having axles, brake beams on each side of each wheel, dead levers pivoted to said truck at each end thereof adjacent said wheels, live levers disposed adjacent said wheels on the opposite sides of said axles from said dead levers, said levers cooperating with said brake beams, brake shoes carried by said brake beams and adapted to have braking cooperation with said wheels, pull rods connecting adjacent pairs of dead and live levers, a dead lever adjacent one of said live levers and connected thereto, a live lever, means for operating said last named live lever including a brake cylinder secured to said truck frame between said last named dead and live levers, the piston of said cylinder being connected to said last named live lever, said last named dead lever being pivoted to said cylinder, said last named live lever being connected to said last named dead lever and said other live lever.

44. In a truck, the combination of a truck frame having a side frame, spaced wheels in supporting relation to said truck frame, said wheels having axles, brake rigging associated with said wheels, said brake rigging including truck levers on each side of each axle, brake beams connecting truck levers at opposite sides of the truck, and operating means for said brake rigging, said operating means including a brake cylinder at each side of the truck supported by said side frame, substantially horizontal cylinder levers operatively connected to each other and to the adjacent brake cylinder, one of said levers being a live lever, said levers being connected to said brake rigging.

45. In a truck, the combination of a truck frame having a side frame, spaced wheels in a supporting relation to said truck frame, said wheels having axles, brake rigging associated with said wheels, said brake rigging including truck levers on each side of each axle, brake beams connecting truck levers at opposite sides of the truck, and operating means for said brake rigging, said operating means including a brake cylinder at each side of the truck supported by said side frame between adjacent wheels, substantially horizontal cylinder levers operatively connected to each other and to the adjacent brake cylinder, said levers being connected to said brake rigging.

46. In a truck, the combination of a truck frame having a side frame, said wheels having axles, spaced wheels in supporting relation to said truck frame, brake rigging associated with said wheels, said brake rigging including truck levers on each side of each axle, brake beams connecting truck levers at opposite sides of the truck, and operating means for said brake rigging, said operating means including a brake cylinder at each side of the truck supported by said side frame, cylinder levers operatively connected to each other intermediate the ends thereof and to the adjacent brake cylinder adjacent their ends, one of said levers being a live lever, said levers being connected to said brake rigging.

47. In a truck, the combination of a truck frame having a side frame, spaced wheels in supporting relation to said truck frame, said wheels having axles, brake rigging associated with said wheels, said brake rigging including truck levers on each side of each axle, brake beams connecting truck levers at opposite sides of the truck, and operating means for said brake rigging, said operating means including a brake cylinder at each side of the truck supported by said side frame between adjacent wheels, substantially horizontal cylinder levers operatively connected to each other intermediate the ends thereof and to the adjacent brake cylinder adjacent their ends, said levers being connected to said brake rigging.

48. In a truck, the combination of a truck frame, spaced wheels cooperating therewith, dead levers pivoted to said truck at each end thereof adjacent said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers above the wheel centers, a brake cylinder mounted on said frame between said wheels, a dead lever pivoted to said brake cylinder adjacent one of said live levers and connected thereto, a live lever operatively connected to said cylinder, said last named live lever being connected to said last named dead lever and said other live lever.

49. In a truck, the combination of a truck frame having a side frame, spaced wheels in supporting relation to said truck frame, brake rigging associated with said wheels, said brake rigging including truck levers on each side of each wheel, connecting means connecting the truck levers at opposite sides of the truck, and operating means for said brake rigging, said operating means including a brake cylinder at each side of the truck supported by said side frame, substantially horizontal cylinder levers operatively connected to each other and to the adjacent brake cylinder, one of said levers being a live lever, said levers being connected to said brake rigging.

WALTER H. BASELT.

CERTIFICATE OF CORRECTION.

Patent No. 2,077,661.                                    April 20, 1937.

WALTER H. BASELT.

It is hereby certified that error appears in the printed specification of the above numbered patent requiring correction as follows: Page 7, second column, lines 53-54, claim 46, strike out the words and comma "said wheels having axles," and insert the same before "brake" in line 55 of said claim; and that the said Letters Patent should be read with this correction therein that the same may conform to the record of the case in the Patent Office.

Signed and sealed this 8th day of June, A. D. 1937.

Henry Van Arsdale
Acting Commissioner of Patents.

(Seal)

cylinder at each side of the truck supported by said side frame between adjacent wheels, substantially horizontal cylinder levers operatively connected to each other intermediate the ends thereof and to the adjacent brake cylinder adjacent their ends, said levers being connected to said brake rigging.

48. In a truck, the combination of a truck frame, spaced wheels cooperating therewith, dead levers pivoted to said truck at each end thereof adjacent said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers above the wheel centers, a brake cylinder mounted on said frame between said wheels, a dead lever pivoted to said brake cylinder adjacent one of said live levers and connected thereto, a live lever operatively connected to said cylinder, said last named live lever being connected to said last named dead lever and said other live lever.

49. In a truck, the combination of a truck frame having a side frame, spaced wheels in supporting relation to said truck frame, brake rigging associated with said wheels, said brake rigging including truck levers on each side of each wheel, connecting means connecting the truck levers at opposite sides of the truck, and operating means for said brake rigging, said operating means including a brake cylinder at each side of the truck supported by said side frame, substantially horizontal cylinder levers operatively connected to each other and to the adjacent brake cylinder, one of said levers being a live lever, said levers being connected to said brake rigging.

WALTER H. BASELT.

CERTIFICATE OF CORRECTION.

Patent No. 2,077,661.  April 20, 1937.

WALTER H. BASELT.

It is hereby certified that error appears in the printed specification of the above numbered patent requiring correction as follows: Page 7, second column, lines 53-54, claim 46, strike out the words and comma "said wheels having axles," and insert the same before "brake" in line 55 of said claim; and that the said Letters Patent should be read with this correction therein that the same may conform to the record of the case in the Patent Office.

Signed and sealed this 8th day of June, A. D. 1937.

Henry Van Arsdale (Seal)

Acting Commissioner of Patents.

CERTIFICATE OF CORRECTION.

Patent No. 2,077,661. April 20, 1937.

WALTER H. BASELT.

It is hereby certified that error appears in the printed specification of the above numbered patent requiring correction as follows: Page 7, second column, lines 53-54, claim 46, strike out the words and comma "said wheels having axles," and insert the same before "brake" in line 55 of said claim; and that the said Letters Patent should be read with this correction therein that the same may conform to the record of the case in the Patent Office.

Signed and sealed this 8th day of June, A. D. 1937.

Henry Van Arsdale (Seal)

Acting Commissioner of Patents.